United States Patent [19]

Carlson

[11] Patent Number: 4,620,947

[45] Date of Patent: Nov. 4, 1986

[54] SOLIDIFICATION OF AQUEOUS RADIOACTIVE WASTE USING INSOLUBLE COMPOUNDS OF MAGNESIUM OXIDE

[75] Inventor: John E. Carlson, Statesboro, Ga.

[73] Assignee: Chem-Nuclear Systems, Inc., Columbia, S.C.

[21] Appl. No.: 555,461

[22] Filed: Oct. 17, 1983

[51] Int. Cl.$^4$ .............................................. G21F 9/16
[52] U.S. Cl. ...................................... 252/628; 106/89; 106/118; 106/121; 252/631; 252/635
[58] Field of Search .............. 252/628, 629, 631, 633, 252/626, 634, 635; 501/12; 106/74, 76, 85, 78, 100, 118, 89, 121, 97; 423/279

[56] References Cited

U.S. PATENT DOCUMENTS

| | | | |
|---|---|---|---|
| 3,126,352 | 3/1964 | Blair et al. | 252/478 |
| 3,507,801 | 4/1970 | Kausz et al. | 252/301.1 |
| 3,837,872 | 9/1974 | Conner | 106/74 |
| 3,988,258 | 10/1976 | Curtiss et al. | 252/301.1 |
| 4,002,483 | 1/1977 | Daugherty | 106/89 |
| 4,011,094 | 3/1977 | Burley et al. | 106/93 |
| 4,122,028 | 10/1978 | Iffland et al. | 252/301.1 |
| 4,249,949 | 2/1981 | Wooler et al. | 252/628 |
| 4,253,985 | 3/1981 | Filter et al. | 252/301.1 |
| 4,340,499 | 7/1982 | Fischer | 252/628 |
| 4,379,081 | 4/1983 | Rootham et al. | 106/97 |
| 4,442,028 | 4/1984 | Wolf et al. | 252/628 |

FOREIGN PATENT DOCUMENTS

| | | | |
|---|---|---|---|
| 2559724 | 10/1977 | Fed. Rep. of Germany | 252/628 |
| 2827030 | 1/1979 | Fed. Rep. of Germany | 252/628 |
| 2910677 | 9/1980 | Fed. Rep. of Germany | 252/628 |
| 145813 | 1/1981 | German Democratic Rep. | 252/628 |
| 49-104100 | 10/1974 | Japan | 252/628 |

Primary Examiner—Stephen J. Lechert, Jr.
Assistant Examiner—Howard J. Locker
Attorney, Agent, or Firm—Benoni O. Reynolds

[57] ABSTRACT

Firm gel structures are formed from hot aqueous radioactive waste solutions containing boric acid by adding powdered magnesium oxide or magnesium hydroxide followed by addition of calcium oxide or calcium hydroxide. Cement may be introduced after addition of the magnesium compound without interfering with subsequent gel reactions. Product rigidity imparted by the gel enables reduction of typical cement usage up to 50% or more in the processing of radioactive boric acid concentrates. This results in more waste being solidified per container, less exothermic heat generation, greater shipping efficiency, and improved resistance to aqueous leaching of radionuclides.

11 Claims, No Drawings

4,620,947

SOLIDIFICATION OF AQUEOUS RADIOACTIVE WASTE USING INSOLUBLE COMPOUNDS OF MAGNESIUM OXIDE

TECHNICAL FIELD

The invention relates to the treatment and disposal of boron containing radioactive waste waters such as characteristically generated by pressurized water reactor (PWR) nuclear facilities. More specifically, the invention relates to the treatment of such wastes in order to convert the same to a form more suitable for handling and disposal by encapsulation in solid binder materials.

ART

Various processes are known for disposing of the aqueous radioactive waste solutions generated in the operation of nuclear reactors. Among the processes currently in use are incorporation of the radioactive waste into a free-standing, solid matrix using a binding agent, such as cement or urea-formaldehyde. Cement is the preferred binding agent over organic materials in many instances because cement is non-combustible and more resistant to chemical and biological attack, offering important safety advantages over resinous binding agents; and, because cement is inexpensive and readily available.

Numerous problems have been encountered, however, for radioactive waste disposal by using a cement-type binding agent. One problem is the narrow range of aqueous liquid necessary to ensure hardening of the cement, requiring large volumes of cement relative to the volume of waste treated, which leads to poor shipping efficiency. Another problem is that long mixing times of the waste-cement mixture are necessary to ensure uniform distribution of aggregate waste-solids until the cement sets, which also increases cost. A further problem is that the boric acid waste common to pressurized water reactors (the primary coolant in the typical PWR contains boric acid as a chemical shim for reactivity control) has resisted direct solidification using cement, and must first be absorbed in drying materials such as vermiculite which also increases cost and reduces shipping efficiency. Another problem sometimes encountered is contraction during hardening of the waste-cement mixture causing undesirable fissures in the solid, thus allowing potential release of radioactive contaminants.

Much work has been done to overcome the various problems associated with radioactive waste as contemplated in the instant invention. The solutions set forth in U.S. Pat. Nos. 4,253,985, 4,122,028, 3,507,801, 3,988,258; East German Pat. No. 145,813; West German Pat. Nos. 2,910,677 and 2,827,030; and Japanese Pat. No. 49-104100 are typical methods to solve radioactive waste disposal problems. While all of the aforesaid references attempt to resolve radwaste disposal, none of these references sets forth processes which are as efficient as the process of the present invention.

INDUSTRIAL APPLICABILITY

It is, therefore, an object of the invention to provide for an improved process for the solidification of radioactive waste using insoluble magnesium oxide compounds.

It is a further object of the invention to provide for greater efficiency and economy radioactive waste solidification.

It is yet a further object of the invention to provide a process for radioactive waste solidification which allows for a greater amount of waste to be disposed relative to the amount of cement employed.

These and other beneficial objects result when the process set forth herein is employed for disposal of boric acid-containing radioactive wastes.

DISCLOSURE

According to the present invention, it has now been discovered that unexpectedly firm gel structures are eventually formed from hot aqueous solutions containing boric acid by the primary addition of powdered magnesium oxide or hydroxide. Cement is then added to the mixture with no substantial thickening; but, during the subsequent addition of calcium oxide or calcium hydroxide, a gel structure of unexpected firmness results. The rigidity imparted by the gel enables reduction of typical cement usage up to 50 percent or more in the processing of radioactive boric acid concentrates. This beneficially results in more waste being solidified per container, less exothermic heat to be dissipated, and reduced shipping costs. Further, improved resistance of the solidified product to aqueous leaching of radionuclides also results.

While the prior art recognizes ways of reducing cement usage through formation of inorganic gels by using soluble compounds such as silicates (U.S. Pat. No. 3,837,872), the process of the instant invention unexpectedly produces a gel structure through the use of substantially insoluble magnesium oxide derivatives. The use of insoluble magnesium salts to promote the formation of a borated gel matrix is even more unexpected in view of the teachings of U.S. Pat. No. 3,126,352.

The present invention relates to direct solidification of hot boric acid solutions by specific addition of magnesium compounds to form magnesium borates, which, after the addition of cement, then complexes with added calcium hydroxide or calcium oxide (lime) so that a uniform solid is produced with no apparent free liquid.

Aqueous boric acid solutions from pressurized water reactors are mixed with finely powdered magnesium oxide or hydroxide to form a magnesium borate complex. While various powdered magnesium oxides or hydroxides may be utilized, the selection of materials is critical with respect to particle size. A particularly effective magnesium oxide powder is Magox 98 HR manufactured by Basic Chemicals. The fineness of this material is such that 99.5 percent will pass through a 200 mesh screen. As set forth, other magnesium oxides or hydroxides can be employed.

The temperature of the aqueous boric acid waste is typically 77 degrees Centigrade when it leaves the reactor and is placed into the liner (container). However, this process will work with boric acid materials at a temperature of 55–95 degrees Centigrade.

The magnesium oxide compound is added to the boric acid waste and is continuously agitated. In fact, agitation is maintained throughout the entire process until, because of increases in viscosity, agitation is no longer possible or required.

The formation of the magnesium borates produces an exotherm which can be monitored by the use of a temperature sensing probe in the container. The exotherm is typically 3–6 degrees Centigrade.

The amount of magnesium oxide or hydroxide required to treat each portion of waste is predetermined in the laboratory using process control procedures. The amount of the magnesium compound added is a function, obviously, of the concentration of the boric acid contained in the waste material. Generally, the amount of magnesium oxide or hydroxide added is about 50 percent or more by weight of the amount of boric acid ($H_3BO_3$) present.

After formation of the magnesium borates, cement is added to the liner and agitation is continued. The amount of cement added is as low as about ½ the weight of the radioactive waste liquid in the system. While the choice of the type of cement is not necessarily critical, the use of various forms of Portland Cement is preferred. Immediately after the addition of cement, the calcium oxide or calcium hydroxide is added to the container. The addition of the calcium oxide component causes an increase in the pH of the system which promotes the formation of the gel matrix. It is important to note that the magnesium oxide or magnesium hydroxide in themselves will not shift the pH to the gelling range, even if added in excess. This then prevents premature gellation before the proper amount of cement has been added and mixed. While not wishing to be bound by same, it is believed that the increase in pH due to the addition of the calcium hydroxide or calcium oxide shifts boron to a higher valence state which promotes an exothermic polymer reaction. It is speculated that a segment of the polymer gel has the following structure:

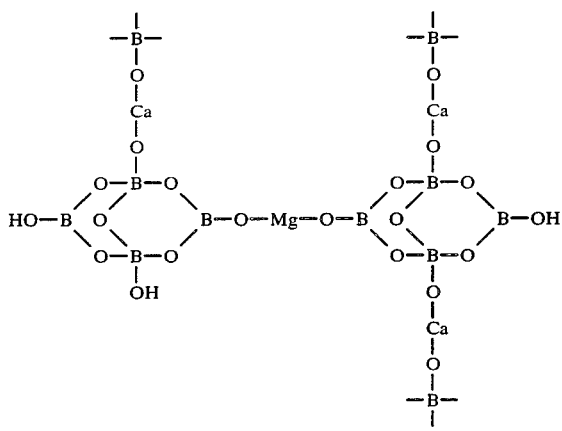

The amount of the calcium hydroxide or calcium oxide added to achieve the desired product gel is about ¼ of the weight of boric acid waste liquid. As set forth above, the amounts of all components to be employed in this process are carefully confirmed in the laboratory using process control procedures which take into account the amount of boric acid present in the waste liquid.

The state of the matrix gel formation can be monitored by various means. Usually, the change in viscosity can be seen by an increase in hydraulic pressure for the agitator drive employed for mixing purposes.

The gel structure itself has a substantial degree of rigidity, as shown in the laboratory, even without the addition of cement. It is significant that the boric acid in the waste becomes an integral part of the gel structure, which in combination with the hydrated cement produces a uniform waste matrix.

The rate at which the cement present in the system exothermically hydrates can be measured by the same probe used to measure the magnesium borate reaction exotherm. Generally, the solidified waste material is sufficiently firm for shipment within about 24 hours. It is important that the calcium oxide or hydroxide be added only after the addition of the cement, because the change in pH resulting from the addition of the calcium component will cause the production of a gel and possibly not allow for adequate mixing of the cement.

Although the process of the invention has been described so far with respect to the use of a pressurized water reactor, the instant invention can be utilized for certain wastes produced from boiling water reactors. Typically, a radioactive sulfate waste is produced from a boiling water reactor. In such a system it is necessary to first dissolve an appropriate amount of boric acid in the waste. Once this is accomplished, the other components which constitute the system are added in a manner employed for a pressurized water reactor boric acid waste system. One distinction, however, is that waste from boiling water reactors is often not of the same high temperature as produced in a pressurized water reactor. Accordingly, such a change in temperature will produce a different set of reaction kinetics that must be first evaluated by laboratory testing.

While magnesium oxides or magnesium hydroxides are both suitable for use, magnesium oxide is preferred because of the reduced cost and weight of the material.

As set forth previously, the instant invention provides several advantages over other processes for waste disposal. Of principal import is the fact that the amount of cement used in the process can be reduced by up to 50 percent. This allows for a considerably greater amount of room in the container for the radioactive waste itself. Also, the final product contains no free liquids. In the event that there is some unreacted liquid, the liquid will, because of the greater density of the solid product, rise to the top of the container. Additional cement can then be added to solidify supernatant liquid. However, in most instances, a uniform material, having no free liquid, should prevail.

A typical liner for radioactive waste disposal contains 5.52 cubic meters of storage space. With prior art processes, only about 3.40 cubic meters of waste could be processed. By the process of this invention, up to 3.96 cubic meters of waste can be effectively solidified in the same size liner.

MODES FOR CARRYING OUT THE INVENTION

Example I

Two separate mixtures were prepared representing radioactive waste solutions containing 10 percent boric acid. These solutions were solidified using the process of this invention and employing components in amounts as set forth in the formulas indicated below. While the material was still in a workable plastic state, a 3-cavity brass mold was filled for each formula to allow compressive strength to be determined on the 5.08 cm. cubes that were formed. The cubes were cured at 71 degrees Centigrade in sealed containers for 1, 2, and 3 days.

|  | Formula #1 | Formula #2 |
|---|---|---|
| 10% boric acid 76.7 degrees C. | 480 ml | 480 ml |
| Magnesium Hydroxide | 40 gm | 40 gm |
| Portland Cement, Type I | 240 gm | — |
| Portland Cement, Type III | — | 240 gm |
| Lime (Calcium Hydroxide) | 140 gm | 140 gm |
| Compression Strength*, 1 Day (kg/cm$^2$) | 14.1 | 17.6 |
| Compression Strength*, 2 Days (kg/cm$^2$) | 16.3 | 19.6 |
| Compression Strength*, 3 Days (kg/cm$^2$) | 17.7 | 22.5 |

*The cure cycle before each strength test included 3 hours cooling in a sealed container and 3 hours air drying prior to placement in a Carver testing press.

While it is necessary to heat small mixtures prepared in the laboratory to accomplish set, in actual usage the mass of the treated waste is usually sufficient to maintain curing temperatures without external heating. In fact, normal exothermic heat of cement hydration increases mass temperatures above those used to obtain cure in the laboratory.

Example II

The following example reflects using the system of this invention in a boiling water reactor waste liquid containing, for example, sulfate waste. While this invention has been described with respect to radioactive waste from a pressurized water reactor or a boiling water reactor, it will be apparent to one skilled in the art that this process has utility for other forms of radioactive and non-radioactive waste products.

Boric acid was added to a 25 percent sodium sulfate solution at 49 degrees C. The components set forth below were then added as in the previous examples. This resulted in a solidified, firm dry product after 16 hours in an oven at about 71 degrees Centigrade.

| 25% Sodium Sulfate solution at 49 degrees C. (BWR Waste) | 200 gm |
|---|---|
| Boric Acid | 16 gm |
| Magnesium Oxide | 10 gm |
| Cement, Portland I | 100 gm |
| Lime (Calcium Hydroxide) | 50 gm |

While the present invention has been described by reference to specifics, it should be understood that the present invention is in no way deemed as limited thereto, but should be construed only as exemplary, as a wide variety of embodiments may be devised without departing from the spirit and scope of the invention.

I claim:

1. A process for the treatment of radioactive waste which comprises:
   (a) first adding a sufficient amount of a magnesium oxide compound to an aqueous boric acid-containing radioactive waste and allowing the magnesium oxide and boric acid to react;
   (b) adding cement to the reacted mixture (a) and uniformly dispersing said cement; and
   (c) then adding and dispersing a sufficient amount of a compound selected from the group consisting of calcium hydroxide and calcium oxide to (b) to cause the formation of a gel matrix.

2. The process of claim 1 wherein the magnesium oxide compound is powdered and selected from the group consisting of magnesium oxide and magnesium hydroxide.

3. The process of claim 1 wherein the amount of the magnesium oxide compound added is at least about 50 percent by weight, of the boric acid ($H_3BO_3$) in the waste.

4. The process of claim 1 wherein the amount of cement added is at least 50 percent by weight of the boric acid waste liquid.

5. The process of claim 1 wherein the amount of calcium oxide or calcium hydroxide is at least about ¼ of the weight of the boric acid waste liquid.

6. The process of claim 1 wherein the waste comes from a pressurized water reactor.

7. The process of claim 1 wherein the waste comes from a boiling water reactor, and boric acid is added to the waste.

8. The process of claim 1 wherein the magnesium oxide compound will pass through a 200 mesh screen.

9. A process for the treatment of radioactive waste which comprises:
   (a) first adding, under continuous agitation, a sufficient amount of a powdered magnesium oxide or magnesium hydroxide to an aqueous radioactive waste solution containing boric acid, the temperature of the water solution being 55–95 degrees C. to produce a magnesium borate derivative;
   (b) adding cement, under continuous agitation, to the magnesium borate derivative; and
   (c) then adding, under continuous agitation, after the cement has been dispersed, a sufficient amount of a compound selected from the group consisting of calcium oxide and calcium hydroxide to b) to produce a gel matrix structure.

10. The process of claim 9 wherein about 0.5 mole of the magnesium compound and 1.5 moles of the calcium compound are added per mole of boric acid.

11. The gel matrix structure produced by any one of claims 1, 2, 3, 4, 5, 6, 7, 8, 9 or 10.

* * * * *